Figure 1:
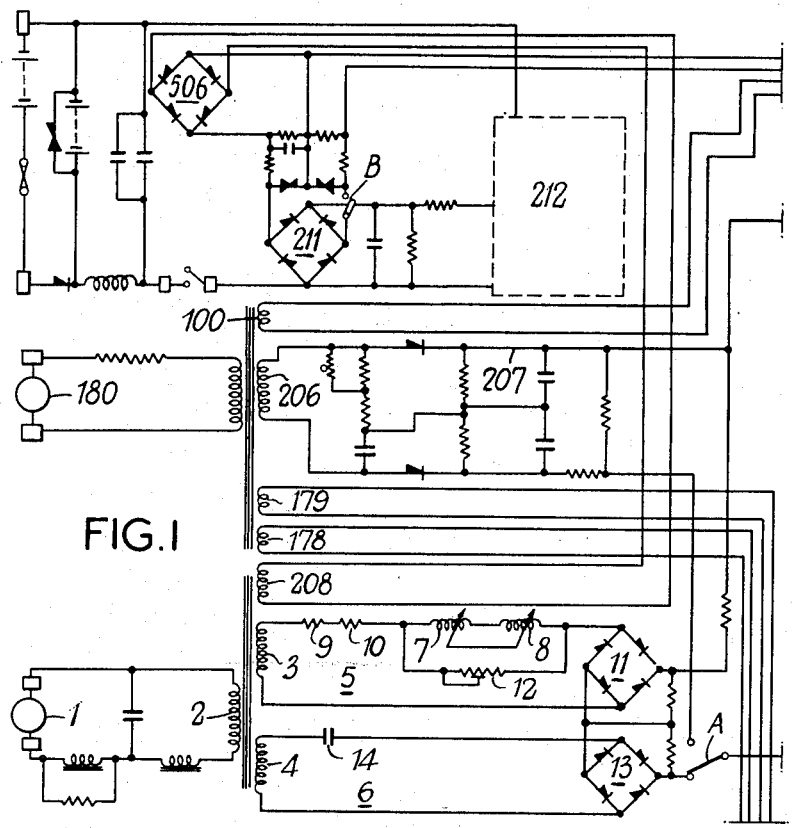

Aug. 31, 1965   B. E. BLACKABY   3,203,179
ENGINE CONTROL SYSTEMS
Original Filed July 13, 1960   6 Sheets-Sheet 1

Inventor
Benjamin Edward Blackaby
By
Karl W. Flocks
Attorney

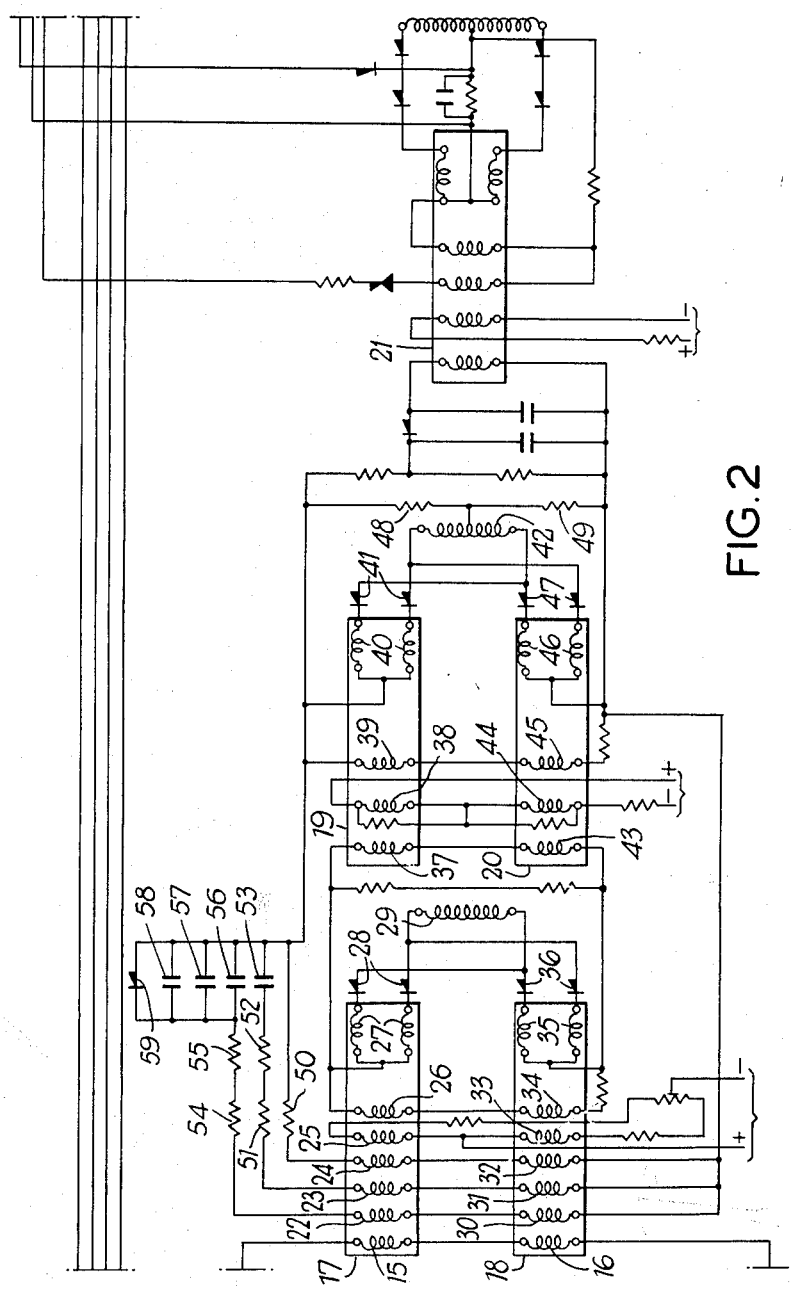

Aug. 31, 1965  B. E. BLACKABY  3,203,179
ENGINE CONTROL SYSTEMS
Original Filed July 13, 1960  6 Sheets-Sheet 3

Inventor
Benjamin Edward Blackaby
By Karl W. Flocks
attorney

Aug. 31, 1965　　　　B. E. BLACKABY　　　　3,203,179
ENGINE CONTROL SYSTEMS
Original Filed July 13, 1960　　　　6 Sheets-Sheet 4

Inventor
Benjamin Edward Blackaby
By Karl W. Flocks
Attorney

Aug. 31, 1965   B. E. BLACKABY   3,203,179
ENGINE CONTROL SYSTEMS
Original Filed July 13, 1960   6 Sheets-Sheet 5
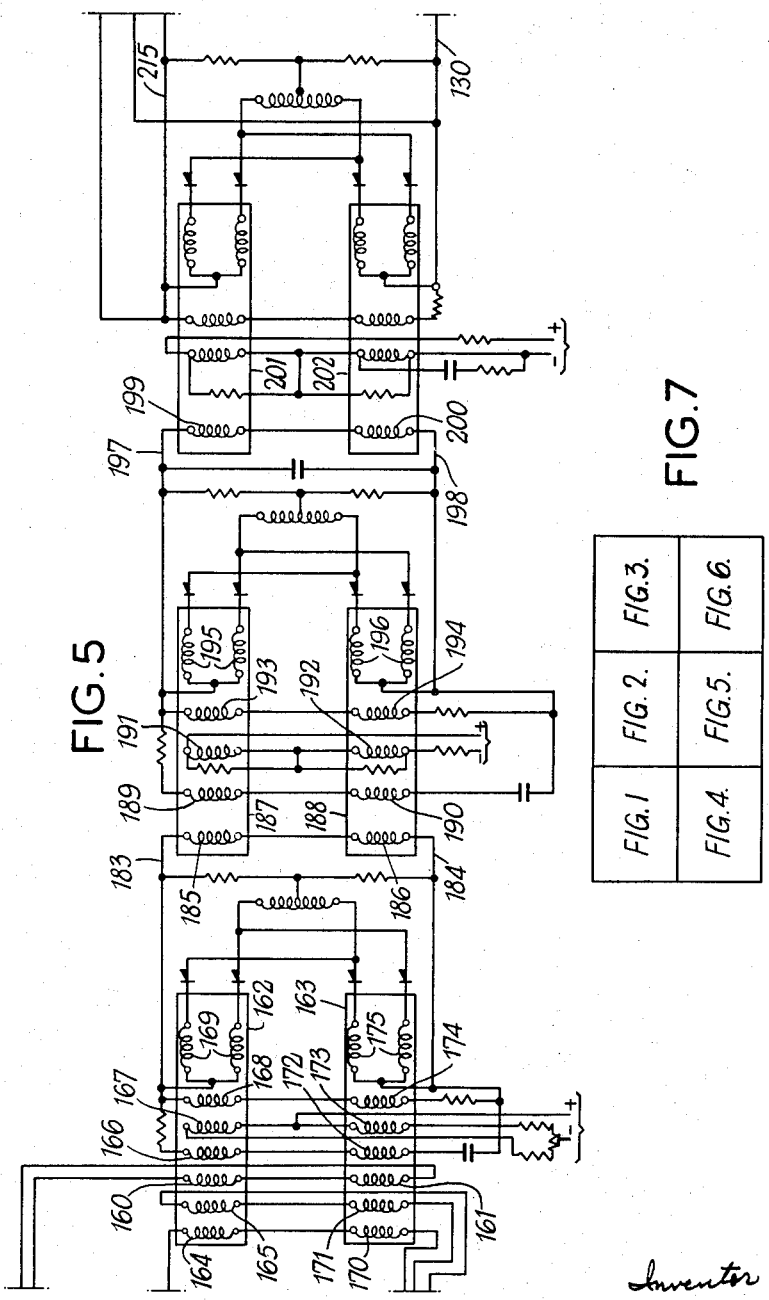

United States Patent Office 3,203,179
Patented Aug. 31, 1965

3,203,179
ENGINE CONTROL SYSTEMS
Benjamin E. Blackaby, Chalfont St. Peter, England, assignor, by mesne assignments, to The De Havilland Aircraft Company Limited, Hatfield, England, a company of Great Britain
Original application July 13, 1960, Ser. No. 42,585, now Patent No. 3,151,450, dated Oct. 6, 1964. Divided and this application Aug. 10, 1964, Ser. No. 388,571
Claims priority, application Great Britain, July 17, 1959, 24,718/59, 24,719/59, 24,720/59, 24,721/59
20 Claims. (Cl. 60—39.28)

This application is a divisional application filed on application Serial No. 42,585 dated July 13, 1960, and granted under Patent No. 3,151,450.

This invention relates to improvements in engine control systems particularly, but not exclusively, for gas turbine engines and is of application in the control of aircraft engines, e.g. for helicopters.

It is an object of the present invention to provide an improved engine control system whereby the engine speed shall be maintained substantially constant within predetermined limits at the speed for which it is set and shall respond rapidly to changes in the speed setting without surge.

The invention broadly stated provides an engine control system comprising means for controlling the magnitude and rate of change of the fuel supplied to the engine in accordance with the magnitude of a physical condition of the engine, engine speed, the speed setting of the engine and changes in the speed setting.

More specifically stated, the invention provides an engine control system for a gas turbine engine for an aircraft comprising means for controlling the magnitude and rate of change of the fuel supplied to the engine in accordance with the magnitude of the engine temperature, engine speed, the speed setting of the engine and changes in the speed setting in the sense to prevent the engine temperature exceeding a predetermined function of engine speed and thereby preventing surging of the engine.

Gas turbine engines normally require great care to be exercised when they are being started in order to avoid a false start and to avoid also what is known as a "wet" start where the engine is flooded with fuel before the engine conditions are suitable for ignition to occur and also to avoid surging. Normally the operator or pilot, in the case of gas turbine engines fitted to an aircraft, is required carefully to watch one or more dials each indicating the magnitude of a physical quantity, each representing a condition of the engine, e.g. engine speed and engine temperature, and to press the "ignition" button at the correct moment and carefully to control the fuel supply to the engine. Additionally, difficulties can arise if the need arises to start the engine of an aircraft when it is in flight.

It is a further object of the present invention to provide an improved engine control system which shall not be subject to the disadvantages referred to above.

According to the present invention, an engine control system comprises means responsive to the position of a control member to produce an electric control signal for controlling the fuel supply to the engine and means responsive to the magnitude of at least one selected physical quantity representing an engine condition to produce an opposing electric signal in opposition to said electric control signal when the magnitude of each selected physical quantity is less than a predetermined value.

Preferably, the physical quantity responsive means is responsive to both engine speed and engine temperature.

Advantageously, the physical quantity responsive means includes a transistor arranged to be conducting when a power supply is switched on and each selected physical quantity is less than a predetermined value, and to be biased to the non-conducting condition when the magnitude of each such physical quantity exceeds its predetermined value.

Conveniently, means is provided for limiting the magnitude of said electric control signal when the latter exceeds a predetermined value in the sense to limit the rate of increase of the fuel supply to the engine.

More specifically, the invention provides an engine control system comprising means for controlling the fuel supply to the engine, means responsive to the angular displacement of a manual control member to produce an electric control signal applied to said fuel control means, a starting control circuit including a transistor, means for applying to said circuit a biasing electric signal the magnitude of which is a function both of engine speed and engine temperature, the arrangement being such that said transistor assumes the non-conducting condition when said engine speed and engine temperature exceed predetermined values, and means for applying a voltage source to said circuit to derive an opposing electric signal therefrom when said transistor is conducting, said opposing electric signal being utilised in opposition to said control signal to reduce or nullify the effect of the latter when the magnitude of the engine temperature and engine speed are less than predetermined values.

Preferably, a system according to any one of the five immediately preceding paragraphs includes means for modifying said electric control signal by an amount which is a predetermined function of engine speed and/or of the rate of change of engine speed.

It is a further object of the present invention to provide an improved magnetic amplifier circuit which is suitable for use in engine control systems and which has an output/input characteristic which varies in a predetermined manner as a function of the rate of change of input signal to the circuit.

Accordingly, the invention provides a magnetic amplifier circuit including a derivative feedback connection operative over one range of rate of change of input signal to the circuit to cause the rate of change of the output of the circuit to lead that of the input signal and over another range of rate of change of input signal to the circuit to cause the rate of change of the output of the circuit to lag behind that of the input signal.

More particularly, the present invention provides a magnetic amplifier circuit which comprises a magnetic amplifier stage having a positive derivative feedback connection between the output of the stage or of a succeeding stage and a control winding of the stage and a negative derivative feedback connection between the output of the stage or of a succeeding stage and a further control winding of the stage, the arrangement being such that over one range of rate of change of input signal the positive derivative feedback connection is operative to cause the rate of change of the output of the stage to lead that of the input signal and over another range of rate of change of input signal the negative derivative feedback connection is operative to cause the rate of change of the output of the stage to lag behind that of the input signal.

Preferably means is provided to reduce or cut-out the effect of the negative derivative feedback connection for large changes in the input signal.

It is a still further object of the present invention to provide an improved frequency responsive electric circuit which is of application in engine control systems and in which the output of the circuit is a function of an input signal to the circuit, the function being variable by varying the circuit parameters without requiring variation in the physical contact between two parts, e.g. electrical contacts.

Accordingly, the invention provides a frequency responsive electric circuit comprising two inductively coupled inductors connected in the circuit and means rotatable to vary the inductance of the inductors.

The circuit may be provided in combination with a further frequency responsive circuit, both the circuits being adapted to be supplied with a common input signal and to have their outputs utilized to provide a final output signal which is a function of the frequency of the input signal and which function is capable of being varied by rotation of said means.

Figure 8:
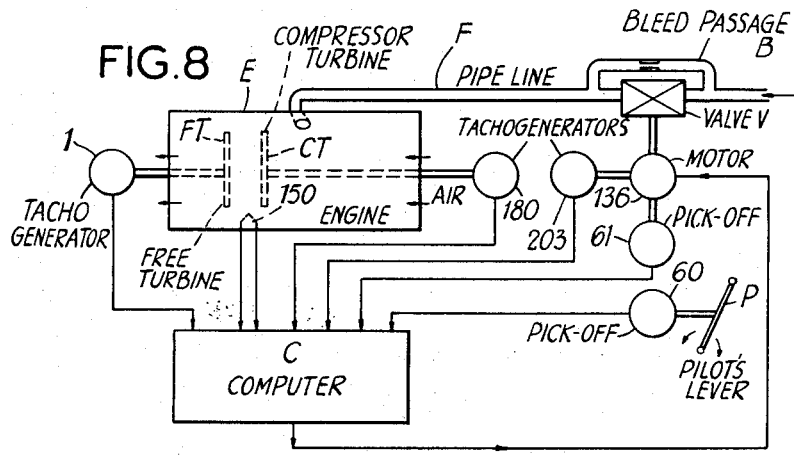
Figure 3:
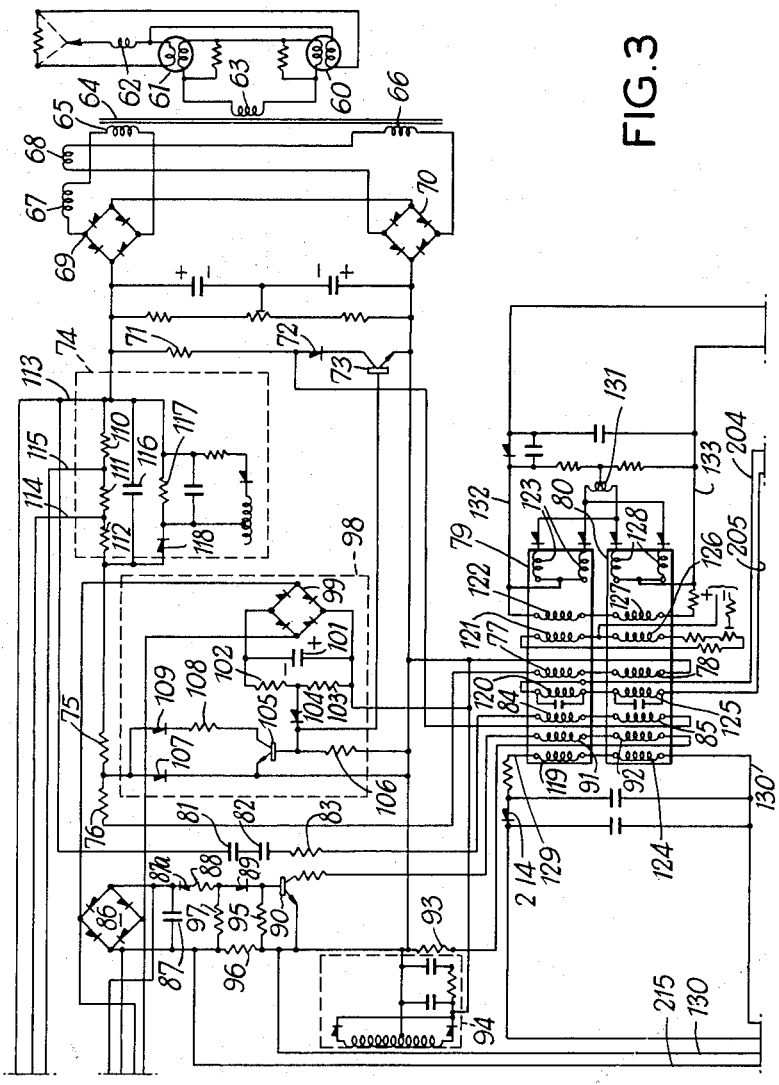
Figure 4:
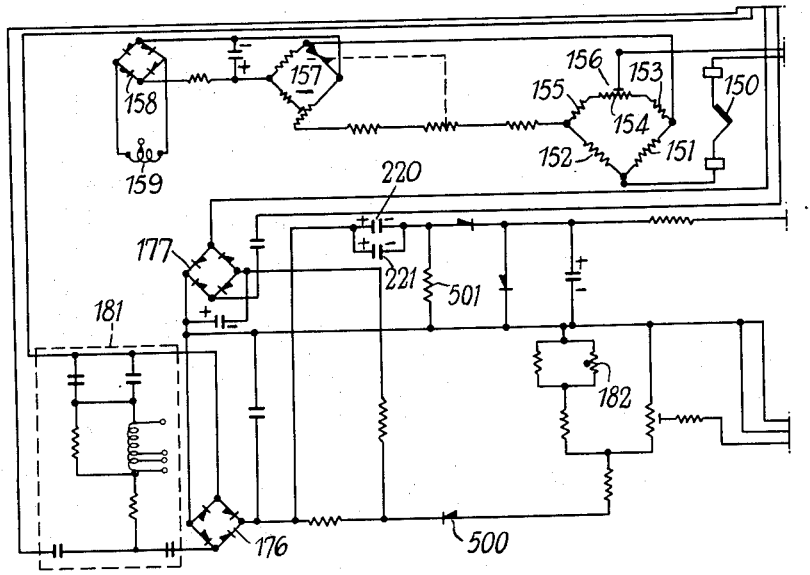
Figure 6:
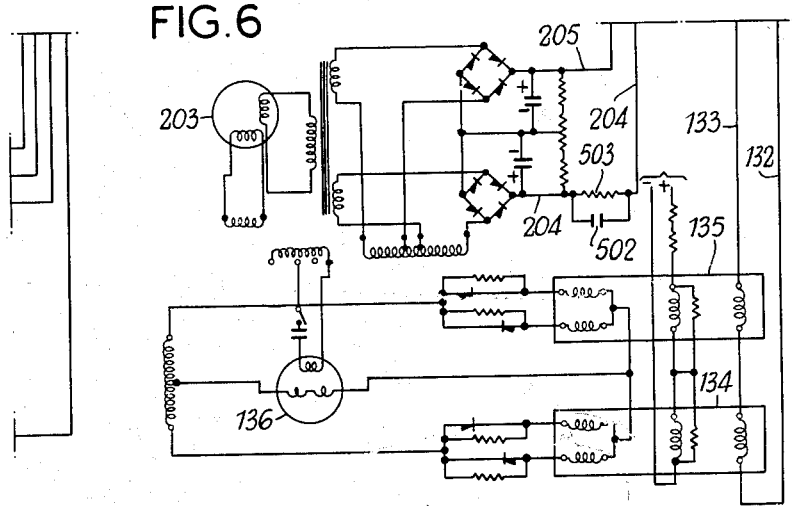
Figure 9:
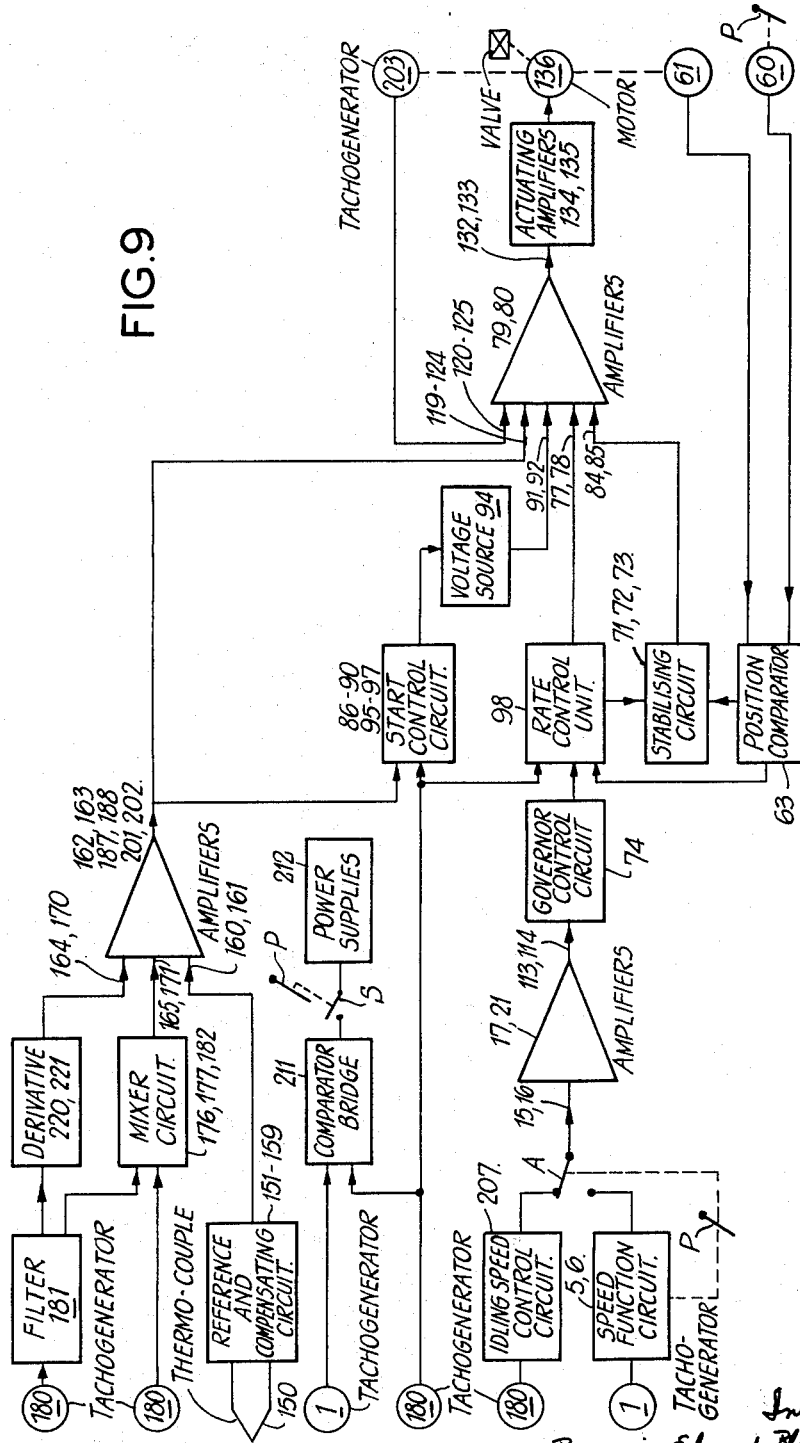

One embodiment of the invention will now be described by way of example, reference being made to the accompanying drawings in which FIGS. 1 to 6 show separate parts of a circuit diagram of a control system for a gas turbine engine for a helicopter, FIG. 7 shows diagrammatically the manner of interconnection of the six parts illustrated in FIGS. 1 to 6, FIG. 8 is a schematic diagram of the control system, and FIG. 9 is a block schematic diagram of the circuits shown in FIGS. 1–6.

Referring first to FIG. 8, a gas turbine engine E, having a free turbine FT and a compressor turbine CT is supplied with fuel along a pipe-line F under the control of a valve V having a by-pass bleed passage B. The valve V is controlled by a two-phase actuator motor 136 which drives a tacho-generator 203 which supplies, to a computer C, an output signal which is a function of the rate of operation of the motor 136. The motor 136 is mechanically coupled to a rotary inductive pick-off 61 and a further similar pick-off 60 is mechanically coupled to the pilot's control lever P, the computer C deriving from the pick-offs 60 and 61 a signal which is a function of the relative angular displacements of the valve V and the pilot's control lever P. A thermocouple 150 is exposed to the inter-turbine temperature and supplies the computer C with a signal which is a function of such temperature. The free turbine FT drives a tachogenerator 1 which supplies the computer C with a signal which is a function of the free turbine speed and the compressor turbine CT drives a tachogenerator 180 which supplies the computer C with a signal which is a function of the compressor turbine speed. The computer C operates on the input signals thereto in a manner hereafter described to produce an output signal which controls the motor 136 and hence the fuel supply to the engine E.

Referring now to FIG. 1, the tachogenerator 1 is driven by the free turbine FT to produce an output signal having a frequency which is a function of the speed of rotation of the free turbine. This output signal is applied across the primary winding 2 of a transformer to provide a common input signal to two similar secondary windings 3 and 4 which are respectively connected in separate frequency responsive circuits 5 and 6. The circuit 5, in accordance with the present invention, includes two inductively coupled inductors 7 and 8 the mutual inductance of which depends upon the angular position of a rotor (not shown). The inductors 7 and 8 are connected in series with each other and with a pair of resistors 9 and 10 between one end of the secondary winding 3 and one end of a diagonal of a full-wave bridge rectifier 11, the other end of the secondary winding 3 being connected directly to the other end of the diagonal of the bridge rectifier 11. The inductors 7 and 8 are shunted by a resistor 12.

The secondary winding 4 of the frequency responsive circuit 6 is connected across one diagonal of a full-wave bridge rectifier 13 through a capacitor 14.

The output of the bridge rectifier 11 is a function of the frequency of the input signal to the circuit 5 and the output of the bridge rectifier 13 is a further function of the frequency of the input signal to the circuit 6. These two outputs are so connected as to provide a subtractive output which is applied through a switch A across the control windings 15 and 16 connected in series of two magnetic amplifiers 17 and 18 connected in push-pull (FIG. 2).

It will be appreciated that the input signal applied across the control windings 15 and 16 is a function of the speed of rotation of the free turbine rotor and that this function may be varied by varying the angular displacement of the rotor controlling the mutual inductance of the inductors 7 and 8.

The inductors 7 and 8 may with advantage be the windings of a synchro or alternating current pick-off, one of the windings being fixed and the other winding being carried on the rotor for angular displacement relative to the fixed winding through 360°, the connections to the winding on the rotor being brought down through a hollow shaft on which the rotor is carried and being coiled to accommodate any twist imparted thereto by angular displacement of the rotor. Alternatively, the inductors 7 and 8 may be fixed and the rotor may carry one or more windings magnetically linking the fixed coils to control the mutual inductance therebetween by its angular position.

The two magnetic amplifiers 17 and 18 are the first pair of amplifiers of three series connected stages, the second of which comprises two similar magnetic amplifiers 19 and 20 also connected in push-pull and the third of which comprises a single magnetic amplifier 21 which operates as an output stage. The magnetic amplifier 17 has four control windings 15, 22, 23 and 24, a bias winding 25, a feed-back winding 26 and A.C. input windings 27 connected through rectifiers 28 across a centre-tapped power supply winding 29 from which the A.C. power is derived. The magnetic amplifier 18 similarly has four control windings 16, 30, 31 and 32, a bias winding 33, a feed-back winding 34 and A.C. input windings 35 connected through rectifiers 36 across the secondary winding 29. The windings 15, 22, 23, 24, 25 and 26 of the amplifier 17 are connected in series with the corresponding windings 16, 30, 31, 32, 33 and 34 of the amplifier 18.

The magnetic amplifier 19 has a control winding 37, a bias winding 38, a feed-back winding 39 and A.C. input windings 40 connected through rectifiers 41 across a centre-tapped power supply winding 42 from which the A.C. power is derived.

The magnetic amplifier 20 has a control winding 43, a bias winding 44, a feed-back winding 45 and A.C. input windings 46 connected through rectifiers 47 across the secondary winding 42. The windings 37, 38 and 39 of the amplifier 19 are connected in series with the corresponding windings 43, 44 and 45 of the amplifier 20.

The output of the amplifiers 19 and 20 is derived across resistors 48 and 49 and a gain-limiting negative feed-back connection for the first two stages is provided through a resistor 50 from across the resistors 48 and 49 to the windings 24 and 32 of the amplifiers 17 and 18 respectively. A further feed-back connection is applied across the windings 23 and 31 through resistors 51 and 52 and capacitor 53, the connection providing derivative positive feed-back and a still further feed-back connection providing derivative negative feed-back is applied across the windings 22 and 30 through resistors 54 and 55, and capacitor 56. Capacitors 57 and 58 are connected in parallel with capacitor 56 and a rectifier 59 is also connected in parallel therewith. The output of the magnetic amplifiers 17 and 18 is applied across the control windings 37 and 43 of the amplifiers 19 and 20 and the output of the latter is applied across the control winding of the magnetic amplifier 21. The values of the resistors 51, 52, 54 and 55 and the values of the capacitors 53, 56, 57 and 58 are selected to be such that over one range of rate of change of input signal to the amplifiers 17 and 18 the positive derivative feed-back connection is operative to cause the rate of change of the output of the amplifiers 19 and 20 to lead that of the input signal and over another range of rate of change of input signal the negative derivative feed-back connection is operative to cause the rate of change of the output of the amplifiers 19 and 20 to lag behind that of the input signal. Thus by way of specific example, the resistors 51 and 54 have a value of 2.7K ohms, the resistors 52 and 55 have a value of 4.7K ohms and the capacitors 53, 56, 57 and 58 have a value of 50 $\mu$f. With those values, the rate of change of the output of the amplifiers 19 and 20 leads that of the input signal to the amplifiers 17 and 18 when the rate of change of the input signal corresponds to a rate of change of 0–1 c.p.s., lags that of the input signal when the rate of change of the latter corresponds to a rate of change of 1–1.5 c.p.s., leads that of the input signal when the rate of change of the latter corresponds to a rate of change of 1.5–1.8 c.p.s. and lags that of the input signal when the rate of change of the latter corresponds to a rate of change of 1.8 c.p.s.–4 c.p.s. An input signal having a rate of change above 4 c.p.s. will give negligible change in output of the amplifier 21 due to the negative feedback which, owing to the chosen value of the capacitors and resistors, reduces the gain of the amplifiers 17, 18, 19 and 20 at such input signal variation rate. When the free turbine rotor has a steady speed of rotation, the input signal to the magnetic amplifiers 17 and 18 will be steady and the output of the amplifier 21, which controls the fuel supply to the engine, will also be steady. When this speed of rotation for which the engine is set increase or decreases, the input signal will rise at a rate which, if corresponding to a rate of change of 0–1 c.p.s. or 1.5–1.8 c.p.s. produces a rate of rise in the ouput of the amplifier 21 which leads that of the input signal and in effect anticipates change in the latter and reduces or increases the fuel supply to the engine to bring the latter back to its steady speed. If, however, the engine speed increases or decreases at a rate corresponding to a rate of change of 1–1.5 c.p.s. or 1.8–4 c.p.s. the rate of change of output of the amplifier 21 lags behind that of the input signal but still reduces or increases the fuel supply to the engine in the sense to bring the latter back to its steady speed. As explained above, the magnetic amplifiers 17, 18, 19 and 20 will not accept a rate of change of input signal corresponding to a rate of change greater than 4 c.p.s., so that if the input signal varies at a rate greater than 4 c.p.s., e.g. due to transients in the circuits, the output of the amplifier 21 is steady and the fuel supply to the engine remains at its previously set level and engine surge is prevented. Furthermore if the magnitude of the change in the input signal is greater than a predetermined magnitude due, for example, to the aircraft being buffeted by wind or, in the case of a helicopter, due to the driven blades becoming disengaged from the drive, the rectifier 59 operates effectively to cut-out the negative derivative feedback and hence the lag in the system so that under these conditions the system has a fast response to handle such changes.

The rotary inductive pick-off 60 (FIG. 3) is mechanically coupled to the pilot's control lever so as to follow displacement of the latter and is electrically coupled to a further rotary inductive pick-off 61. The pick-off 61 is mechanically coupled to the output shaft of the two-phase actuator motor 136 (FIGS. 6 and 8) controlling the operation of the fuel throttle valve V (FIG. 8) of the engine so as to follow the latter and is also electrically connected to a power supply winding 62 so as to produce across the primary winding 63 of a transformer 64 an electric control signal, the magnitude and relative phase of which is a function of the relative angular displacement between the pick-offs 60 and 61 and hence of the relative angular displacements of the pilot's control lever P and the engine throttle valve V. The transformer 64 has two secondary windings 65 and 66 respectively connected to power supply windings 67 and 68 and also respectively connected to full-wave bridge-rectifier circuits 69 and 70. One end of a resistor 71 is connected to the bridge-rectifier circuit 69 and the resistor 71 is connected in series with a rectifier 72 in the collector circuit of a transistor 73 the emitter electrode of which is connected to the bridge-rectifier circuit 70. The transistor 73 is arranged to be normally conducting during start up and below a predetermined engine speed, e.g. 9,000 r.p.m. and the rectifier 72 is provided to allow current to flow only during opening movement of the throttle, by advance of the pilot's control lever P, to give a voltage across the resistor 71. The one end of the resistor 71 is connected through a governor control circuit 74, which will be described in greater detail hereafter, and thereafter through resistors 75 and 76 to the two control windings 77 and 78 connected in series of two magnetic amplifiers 79 and 80, the magnetic amplifiers being connected in push-pull. The voltage developed across the resistor 71 is applied through capacitors 81 and 82 and resistor 83 across the control windings 84 and 85 connected in series of the magnetic amplifiers 79 and 80. The output of the magnetic amplifiers 79 and 80 controls the actuator motor 136, as described below.

A starting control circuit is provided comprising a full-wave bridge rectifier 86 (FIG. 3) across one diagonal of which is connected a secondary winding 100 (FIG. 1) which derives a signal from the tacho-generator 180 driven by the compressor turbine CT, the amplitude and the frequency of the electric signal so produced being a function of the compressor turbine speed. The output of the bridge rectifier 86 is applied across a capacitor 87 and through a rectifier 87a, a resistor 88 and a rectifier 89 to the base electrode of a transistor 90, the collector electrode of which is connected to one side of control windings 91 and 92, connected in series, of the magnetic amplifiers 79 and 80. The emitter electrode of the transistor 90 is connected through a resistor 93 to the other side of the series-connected windings 91 and 92 and a rectified voltage is applied across the resistor 93 from a suitable voltage source 94 including a power supply winding. The base electrode of the transistor 90 is connected to the emitter electrode thereof through a resistor 95 and the emitter electrode is connected to the junction of the resistor 88 and rectifier 89 through resistors 96 and 97, the resistor 96 having applied thereacross along lines 215 and 130 an electric signal the magnitude of which is a function of engine temperature, as described below. This function need not necessarily be a linear function and desirably is non-linear over at least a part of its characteristic.

The emitter electrodes of the transistors 73 and 90 are directly connected to each other and between these emitter electrodes and the junction of the resistors 75 and 76 is connected a rate control unit 98 which is arranged to provide one limit for the output signal to the windings 77 and 78 at low compressor speeds, e.g. speeds below 9,000 r.p.m., and a second higher limit above such speeds. This control unit 98 comprises a full-wave bridge rectifier 99 having connected across one diagonal thereof the secondary winding 100 (FIG. 1) which derives a signal from the tacho-generator 180 driven by the compressor turbine and which has a magnitude and frequency which is a function of the compressor turbine speed. Connected across the other diagonal of the rectifier bridge 99 is a capacitor 101 and also two resistors 102 and 103 in series. The base electrode of the transistor 73 is connected to the junction of the resistors 102 and 103 through a rectifier 104 and to the base electrode of a further transistor 105, the base electrode of the latter being connected to its emitter electrode, and also to the emitter electrodes of the transistors 73 and 90, through a resistor 106.

The emitter electrode of the transistor 105 is also connected to the junction of the resistors 75 and 76 through a rectifier 107, and the collector electrode thereof is connected to the junction of the resistors 75 and 76 through a resistor 108 and a rectifier 109.

The governor control circuit 74 comprises three resistors 110, 111 and 112 connected in series, an input signal to the governor circuit being applied along lines 113 and 114, across resistors 110 and 111 and derived from the output of the magnetic amplifier 21 which output signal is a function of the engine speed. A feed-back connection to the magnetic amplifier 21 is taken along a line 115. A capacitor 116 is connected in parallel with the resistors 110, 111 and 112, and also connected across these resistors and in parallel therewith is a further resistor 117 in series with a rectifier 118, rectified power being applied across the resistor 117 from a suitable power source including a power supply winding as indicated.

The magnetic amplifier 79, has, in addition to control windings 77, 84 and 91, a control winding 119, a further control winding 120, a bias winding 121, a feedback winding 122 and A.C. windings 123. The magnetic amplifier 80 similarly has, in addition to control windings 78, 85 and 92, a control winding 124, a further control winding 125, a bias winding 126, a feed-back winding 127 and A.C. windings 128. The control windings 119 and 124 are connected in series and are supplied with an input signal along lines 129 and 130, which signal is derived as a function of engine temperature. The bias windings 121 and 126 are connected in series as are the feed-back windings 122 and 127. The A.C. windings 123 and 128 are supplied with power from a power supply winding 131, and the output from the amplifiers 79 and 80 is supplied along lines 132 and 133 to a further pair of magnetic amplifiers 134 and 135 (FIG. 6) connected in push-pull the output of which is utilised to control the two-phase actuator motor 136. The windings 120 and 125 are connected in series and are supplied with a signal derived from the tachogenerator 203 driven by the motor 136 as a function of the rate of operation of such motor.

The thermo-couple 150 (FIG. 4) is arranged between the turbines FT and CT to measure the engine inter-turbine gas temperature and is connected at one end of the junction of a copper resistor 151 and a resistor 152 of eureka wire forming part of a bridge network embodying further resistors 153, 154 and 155, the resistor 154 being tapped by means of a slider 156. Across one diagonal of this resistance bridge is connected one diagonal of a further resistance bridge 157, the other diagonal of which is connected across a full-wave rectifier bridge 158 supplied with power from a power supply winding 159. This arrangement functions to produce an output signal between the slider 156 and the other end of the thermocouple whose magnitude and direction is determined by the difference between engine temperature and a temperature set by the position of the slider 156. This output signal is applied across two control windings 160 and 161 connected in series of a pair of parallel connected magnetic amplifiers 162 and 163 (FIG. 5).

The magnetic amplifier 162 has further control windings 164 and 165, a positive derivative feed-back winding 166, a bias winding 167, a negative feed-back winding 168 and A.C. windings 169. The magnetic amplifier 163 has similar control windings 170 and 171, a positive derivative feed-back winding 172, a bias winding 173, a negative feed-back winding 174 and A.C. windings 175. The A.C. windings are energised from a centre-tapped power supply winding.

The windings 164 and 170 are connected in series, as are the windings 165 and 171, and derive singles from a circuit which comprises full-wave bridge rectifiers 176 and 177 each of which has a diagonal connected across separate windings 178 and 179 respectively (FIGURE 1). The windings 178 and 179 derive signals the frequences of which are functions of the compressor turbine speed from the tachogenerator 180 driven by the compressor turbine of the engine. A filter network 181 (FIG. 4) is connected across the winding 178 to modify the signal produced by the latter in a predetermined manner. The signal from the winding 179 is rectified in the bridge rectifier 177 and mixed with the signal from the winding 178 in a mixer circuit incorporating a thermistor 182 which modifies the mixed signal in accordance with ambient temperature. The output from this circuit is supplied across the input windings 165 and 171.

The circuit 181 is a high-pass filted so that the output signal from the winding 178, whose voltage would otherwise be a linear function of the frequency or compressor turbine speed, has its voltage altered to be a non-linear function. With increasing speed, the voltage rises at first and then falls, after which it rises again. The voltage of the output signal from the winding 179 after rectification is a linear function of the speed. The mixer circuit has the effect of substracting the linear from the non-linear function and the difference signal is passed through a rectifier 500 which suppresses the positive component. This leaves a signal which, after a first constant level, dips and then returns to the constant level. This is fed to the control windings 165 and 171.

The two capacitors 220 and 221 in parallel, together with the resistor 501, act as differentiating circuit for the non-linear function output signal and give a positive derivative which is fed to the control windings 164 and 170. This is only effective on acceleration above a certain speed, that is beyond the dip.

The output from the amplifiers 162, 163 along lines 183 and 184 is thus a predetermined function of the difference between the engine temperature and a datum temperature and a function also of the compressor turbine speed and ambient temperature, these functions being controlled in a predetermined manner, and it is further a function of the rate of change of compressor turbine speed. The output along the lines 183 and 184 is applied across series connected control windings 185 and 186 of parallel connected magnetic amplifiers 187 and 188 which also respectively embody positive derivative feed-back windings 189 and 190, bias windings 191 and 192, negative feed-back windings 193 and 194 and A.C. windings 195 and 196. The A.C. windings are energised from a centre-tapped power supply winding. The output from the amplifiers 187 and 188 is taken along lines 197 and 198 and is supplied across series connected control windings 199 and 200 of parallel-connected magnetic amplifiers 201 and 202 which act as a buffer stage and which supply an output along the lines 215 and 130 referred to above. The line 215 is connected to the line 129 through a rectifier 214 so as to apply a unidirectional signal to the control windings 119 and 124. The tachogenerator 203 provides an output signal the magnitude of which is proportional to the rate of operation of the actuator motor 136 from which signal is derived an output signal along lines 204 and 205 which is applied across the series-connected control windings 120 and 125 of the amplifiers 79 and 80 and the magnitude of which is proportional to the rate of operation of the actuator motor 136 plus the derivative thereof, the necessary differentiating circuit including the capacitor 502 and the parallel resistor 503. Thus, the final output signal along the lines 132 and 133 is a function of the magnitude of the departure of the engine speed from that for which it is set, a function of the difference between the engine temperature over a datum, which varies in a predetermined manner as a function of the compressor turbine speed and ambient temperature, this signal being amplified in the amplifiers 134 and 135 and controlling the actuator motor 136 in the sense to control the fuel supplied to the engine so as to prevent engine surge.

The tachogenerator 180 (FIG. 1) also provides a signal through a winding 206 to a circuit indicated generally at 207 which selects the idling speed of the engine and which is adapted to be connected across the control windings 15 and 16 through the switch A. Furthermore, a signal from the tachogenerator 1 is taken from the winding 208 and rectified by a fullwave rectifier bridge 506, and a signal from the tachogenerator 180 is taken from the winding 100 and rectified by the full-wave rectifier bridge 86, these two signals being applied to a power-supply control circuit which includes a full-wave rectifier bridge 211, the output of which is arranged to switch off the power supplies provided by a suitable circuit 212 if either tachogenerator fails. The circuit 212 includes a transformer having all the secondary power supply windings and a 12 volt bias supply.

To facilitate the understanding of the operation of the circuits illustrated in FIGS. 1 to 6 reference will first be made to FIG. 9 in which these circuits are shown schematically and in which like references are used to denote like parts. It will be observed that the valve-controlling motor 136 is under the control of the magnetic amplifiers 79 and 80 which have five inputs and the output from which controls the motor 136 through the actuating amplifiers 134 and 135. The first input to the amplifiers 79, 80 is a temperature signal derived from the magnetic amplifiers 162, 163, 187, 188, 201 and 202 and is a function of compressor turbine speed and the rate of change thereof, engine temperature and ambient temperature. The second input to the amplifiers 79, 80 is a biasing signal derived from the start control circuit 86–90, 95–97 which signal on starting up the engine opposes the third input which is a rate control signal derived from the rate control unit 98. The fourth input is a stabilizing signal which is only effective up to 9,000 r.p.m. and is derived from a stabilizing circuit composed of the resistor 71, diode 72 and transistor 73. The fifth input to the amplifiers 79 and 80 is a feed-back signal derived from the tachogenerator 203 as a function of the rate of operation of the motor 136 and of the derivative thereof.

The signal from the tachogenerator 180 representing compressor speed is supplied to the filter 181 to derive a signal which is a non-linear function of the compressor speed and which, through the capacitors 220 and 221 and the resistor 501, provides a derivative of this non-linear function to the magnetic amplifiers 162, 163, 187, 188, 201 and 202. This non-linear function of compressor speed is also supplied to the mixer circuit which includes the bridge rectifiers 176 and 177 and incorporates the thermistor 182. Also supplied to this mixer circuit is a signal representing compressor speed derived from the tachogenerator 180 so that the output of the mixer circuit to the amplifiers 162, 163, 187, 188, 201 and 202 is the difference between the non-linear function and linear function of compressor speed and is also a function of the ambient temperature. The thermocouple 150 which measures engine temperature supplies a signal to the reference and compensating circuits 151–159, the output of which circuit is supplied to the magnetic amplifiers 162, 163, 187, 188, 201 and 202 so that the output from the latter is the temperature signal which is a function of compressor speed and the rate of change thereof, engine temperature and ambient temperature. This temperature signal is also fed to the start control circuit 86–90, 95–97 together with a signal representing compressor speed derived from the tachogenerator 180 to derive through the voltage source 94 the biasing signal to the mixer amplifiers 79, 80.

The switch A is arranged to be controlled by the pilot's lever P to connect the idling speed control circuit 207 to the amplifiers 17 to 21 when the pilot's lever P is displaced over the range 0–20° and to connect the speed function circuits 5 and 6 to the amplifiers 17 to 21 when the pilot's lever is displaced beyond 20°. The idling speed selector circuit 207 selects the idling speed as a function of compressor speed. The speed function circuits 5 and 6 select the engine speed as a function of the free turbine speed and this function is varied by displacement of the pilot's lever P by displacement between 60–120° by causing such displacement to vary the mutual inductance of the inductors 7 and 8. The output from the amplifiers 17 to 21 passes through the governor control circuit 74 to provide an input signal to the rate control unit 98 which also has a second input as a function of compressor speed and a third input deriving from the position comparator 63 which is a function of the difference between the angular displacements of the pick-offs 60 and 61. The governor control circuit 74 is operative during the displacement of the pilot's lever P between 0° to 20° to exert a governing action as a function of compressor turbine speed. 20° displacement of the pilot's lever P corresponds to an idling compressor turbine speed of 14,000 r.p.m. At compressor turbine speeds above 14,000 r.p.m., due to displacement of pilot's lever beyond 20° and changeover of the switch A, the circuit 74 exerts a governing action as a function of the free turbine speed. The rate control unit 98 provides the rate control signal to the mixer amplifiers 79, 80 and limits the rate of opening of the valve V to one level up to 9,000 r.p.m. and to a higher level at engine speeds above this level. The position comparator 63 also supplies a comparison signal to the stabilizing unit 71, 72, 73 which is controlled by the rate control unit 98 so as to be inoperative above 9,000 r.p.m but to provide below this speed a stabilizing signal to the mixer amplifiers 79, 80.

There is also provided a safety circuit comprising the comparator bridge 211 supplied with inputs representing respectively compressor speed and free turbine speed and connected through a switch S to the power supplies 212, which switch S is arranged to be closed by the pilot's lever P when displaced between 20–120° so that any failure of either tachogenerator 1 and 180 sensed by the comparator bridge 211 operates automatically to switch-off the power supplies.

In order to start the engine the pilot's lever P is displaced from 0°–20° and the power is switched on. The opposing (biassing) signal from the start control circuit 86–90, 95–97 opposes the rate control signal from the rate control unit 98 and the valve V remains closed allowing only a small quantity of fuel to reach the engine through the bleed passage B. The switch A is connected to the idling circuit 207. The pilot starts the engine and the engine speed and engine temperature rise until a correlated value is attained when the start control circuit 86–90, 95–97 ceases to function and the biasing signal is removed with the result that the rate control signal now becomes operative limiting the opening rate of the valve V to one value below 9,000 r.p.m. and to a higher value above this speed. When the engine speed attains 9,000 r.p.m. the stabilizing signal derived from the stabilizing unit 71, 72, 73 as a function of the difference between the positions of the pick-offs 60 and 61 ceases. The engine now achieves its ground idling speed and so far is under the overriding control of the temperature signal.

The pilot then moves the lever P from 20° to 60° which is the minimum flight position, thereby connecting the switch A to the speed function circuits 5 and 6 and closing the switch S to set the safety circuit. As the engine speed rises above 14,000 r.p.h. the governor control circuit becomes operative, to exert a governing action as a function of the free turbine speed and it will be seen that the motor 136 is under the control of signals representing the temperature signal, the free turbine speed and the position error between the pick-offs 60 and 61. For flight conditions the pilot's lever P is displaced between 60° and 120° varying the mutual inductance of the inductors 7 and 8 so that the rate control signal to the mixer amplifiers 79, 80 is a function of the free turbine speed, which function is variable as a function of the position of the pilot's lever P, is a function of the compressor speed and is also a function of the position error of the pick-offs 60 and 61 so that the opening of the valve V and hence the engine speed is controlled to maintain the engine temperature below the datum determined by the temperature signal.

It will be appreciated from the above that the arrangement described avoids surging of the engine and also avoids a "wet" start.

The operation of the circuit illustrated in FIGS. 1 to 6 will now be described in greater detail with reference to these figures. When the engine is to be started, the switch A connects the circuit 207 across the windings 15 and 16. The pilot swtches on the power and moves his control lever P from the neutral position to the idle position, e.g. through an angle of 20°, thus producing a relative angular displacement between the rotary inductive pick-offs 60 and 61. This produces a control signal which is applied across the control windings 77 and 78. The transistor 90 is conducting and a biasing signal is supplied from the starting control circuit across the windings 91 and 92 in opposition to the control signals applied across the windings 77 and 78, so that the output from the magnetic amplifiers 79 and 80 is such as to cause the actuating motor 136 to close the throttle valve V. A limited amount of fuel is admitted to the engine E from the by-pass bleed passage B of the throttle valve in an amount sufficient to allow ignition to take place. The pilot presses the ignition button and ignition occurs and the engine starts. The engine speed increases and the engine temperature increases, so that the transistor 90 is biased to cut-off when the engine speed and engine temperature reach appropriate correlated values. When this occurs, the biasing signal from the starting control circuit applied across the windings 91 and 92 is cut-off and the signals applied across the windings 77 and 78 become effective so that the engine is now under the control of the pilot's control lever P. The throttle valve begins to open and a stabilizing signal is applied across the windings 84 and 85. The control signal applied across the windings 77 and 78 is modified by the rate control unit 98.

At speeds below a predetermined speed, e.g. 9,000 r.p.m. the transistor 105 is conducting and the control signal applied across the winding 77 and 78 is limited by the rectifier 109 which is conductive below a predetermined level of signal. Above the predetermined engine speed, e.g. 9,000 r.p.m., the transistor 105 is non-conductive and the control signal applied across the winding 77 and 78 is limited by the rectifier 107. This is conductive at a higher level of signal. In this way the rate of opening of the throttle valve is limited to a slow rate up to a predetermined engine speed of 9,000 r.p.m., and thereabove the rate of opening of the throttle valve is limited to a higher rate. No such limit is imposed on the rate of closing of the throttle valve.

The stabilizing signal across the windings 84 and 85 is derived from the voltage developed across the resistor 71 and is rendered ineffective upon the transistor 73 becoming non-conductive at the predetermined engine speed of 9,000 r.p.m.

Throughout this operation it will be understood that the opening of the throttle valve by the actuator motor remains under the over-riding control of the unidirectional input signal applied along the lines 129 and 130 to the control winding 119 and 124, which signal is derived as a function of engine temperature.

Further movement of the pilot's control lever P to produce a displacement greater than 20° causes the switch A to move to connect the input windings 15 and 16 across the circuits 5 and 6. At the same time the output from the bridge 211 is connected to the circuit 212, by means of a switch B similarly operated to the switch A, to set the safety circuit. The movement of the pilot's lever P between 20° and 60° produces a transition from ground idling to governing at 85% of maximum free turbine speed, the output from the amplifier 21 modifying the controlling signal applied across the control windings 77 and 78 in the manner described above. Further movement of the pilot's control lever P between 60° and 120° selects a corresponding engine speed between 85% and 100% of maximum free turbine speed and varies the mutual inductance of the inductors 7 and 8, by movement of the rotor mentioned above, to produce a corresponding controlling signal.

The movement of the pilot's control lever P in the sense to increase engine speed causes the actuator motor 136 to open the fuel throttle at a limited maximum rate.

At the same time, the engine temperature is prevented from exceeding a datum value which is not a fixed temperature but which varies with compressor turbine speed and ambient temperature. Thus for low compressor speeds, the datum value is steady but decreases as compressor speeds are reached at which a danger of surge arises. The datum value then increases again until the steady value is reached for higher compressor speeds. If the compressor turbine acceleration exceeds a certain low value, the datum value is lifted temporarily so as to permit a higher engine temperature after the dip in datum value. The extent of the dip in datum value which corresponds to safe conditions in the engine varies in accordance with ambient temperature. This temperature datum characteristic is reproduced in the mixed output signal derived from the circuit 181 as described above and applied to the control windings 165 and 171.

As the engine temperature, sensed by the thermo-couple 150, approaches datum, the output signal, modified in the magnetic amplifiers and their associated circuits, causes operation of the actuator motor 136 to maintain the engine temperature below datum value. There is a response delay in the thermo-couple but the resultant lag is overcome by positive derivative feed-back in the circuits of the magnetic amplifiers 162, 163, 187 and 188, which give a lead to the signal to avoid overshoot of the datum. This perimts greatest possible acceleration of the engine consistent with safe conditions in the engine.

I claim:

1. A control system for starting a gas turbine engine, the system including a control valve for controlling the fuel supply to said engine, actuating means operable in response to an electrical input signal to change the setting of said control valve, first means responsive to engine speed and to ambient temperature and to engine temperature to derive an electrical temperature signal representing the amount by which said engine temperature is exceeded by a datum temperature which is a function of engine speed and of ambient temperature, second means responsive to engine speed and to the difference between the actual and desired settings of said control valve to derive an electrical rate-control signal, third means responsive to the engine speed and supplied with said temperature signal to derive an electrical biassing signal and including circuit means operable to cut-off said biassing signal upon attainment by said engine of a predetermined operating condition, and electrical mixing means supplied with said temperature signal and said rate-control signal and with said biassing signal in opposition to said rate-control signal to derive an electrical input signal and apply it to said actuating means, said rate-control signal being rendered substantially ineffective by said biassing signal until said predetermined operating condition of said engine is attained.

2. A system according to claim 1, wherein said circuit means is such that said predetermined operating condition of said engine comprises preselected correlated values of engine speed and of engine temperature.

3. A system according to claim 1, wherein the system includes means for deriving an electrical speed signal which is a function of engine speed, said third means being supplied with and being arranged to combine said speed signal and said temperature signal to form a combined electrical signal and including a voltage source for generating an electrical opposing signal arranged to oppose said combined electrical signal and including a bi-state device, said bi-state device being controlled according to the difference of said combined electrical signal and said opposing signal to cut off said biasing signal when said engine attains said predetermined operating condition.

4. A system according to claim 1, which includes fourth means responsive to engine speed and to said difference between said actual and desired settings of said control valve to derive an electrical stabilizing signal which persists until a predetermined engine speed is attained, and means for supplying said stabilizing signal to said mixing means to modify said electrical input signal.

5. A system according to claim 1, which includes fourth means responsive to the rate of operation of said control valve to derive an electrical valve signal representing said rate of operation, and means for supplying said valve signal to said mixing means to modify said electrical input signal.

6. A system according to claim 5, wherein said fourth means includes a differentiating circuit whereby said electrical valve signal is a function both of said rate of operation of said control valve and also of the derivative of said rate of operation of said control valve.

7. A control system for starting a gas-turbine engine having a compressor turbine and a free turbine, the system including a control valve for controlling the fuel supply to said engine, actuating means operable in response to an electrical input signal to change the setting of said control valve, a control member for selecting a desired setting of said control valve, first means responsive to compressor-turbine speed and to ambient temperature and to engine temperature to derive an electric temperature signal representing the amount by which said engine temperature is exceeded by a datum temperature which is a function of said compressor-turbine speed and of said ambient temperature, second means responsive to engine speed to derive an electrical speed signal, third means responsive to the difference between the actual and desired settings of said control valve to derive an electrical position error signal, fourth means responsive to the compressor turbine speed to derive a first electrical control signal representing a desired idling speed, fifth means responsive to the free-turbine speed to derive a second electrical control signal representing a desired operating speed of said engine, rate-control means supplied with said speed signal and said position error signal, switch means operated by said control member and arranged selectively to supply said first and second electrical control signals to said rate-control means respectively at low and at high settings of said control member whereby said rate-control means derives an electrical rate-control signal as a function of said speed signal, said position error signal and one of said first and second electrical control signals, and electrical mixing means supplied with said temperature signal and with said rate-control signal to derive said electrical input signal therefrom and apply it to said actuating means.

8. A system according to claim 7, wherein said fifth means includes modifying means actuated by said control member at high settings of said control member to modify said second electrical control signal as a function of the setting of said control member.

9. A system according to claim 7, which includes sixth means responsive to said compressor-turbine speed and supplied with said temperature signal to derive an electrical biasing signal, said sixth means including circuit means for cutting off said biasing signal upon attainment by said engine of a predetermined operating condition, and means for supplying said biasing signal to said mixing means in opposition to said rate-control signal, whereby said rate-control signal is rendered substantially ineffective until said predetermined operating condition of said engine is attained.

10. A system according to claim 9, wherein said circuit means is such that said predetermined operating condition of said engine comprises preselected correlated values of engine speed and of engine temperature.

11. A system according to claim 9, wherein the sixth means is supplied with and is arranged to combine said speed signal and said temperature signal to form a combined electrical siganl, a voltage source is provided for generating an electrical opposing signal arranged to oppose said combined electrical signal and a bi-state device is provided responsive to the difference between said combined electrical signal and said opposing signal to cut off said biasing signal when said engine attains said predetermined operating condition.

12. A system according to claim 7, which includes sixth means responsive to engine speed and to said difference between said actual and desired settings of said control valve to derive an electrical stabilizing signal which persists until a predetermined engine speed is attained, and means for supplying said stabilizing signal to said mixing means to modify said electrical input signal.

13. A system according to claim 12, wherein said sixth means includes a bi-state device supplied with said error signal and a biassing circuit responsive to engine speed and arranged to control said bi-state device such that at low compressor turbine speeds said bi-state device is operated to permit said error signal to pass to said mixing means while at high compressor-turbine speeds said bi-state device is unoperated to prevent said error signal from passing to said mixing means.

14. A system according to claim 7, which includes sixth means responsive to the rate of operation of said control valve to derive an electrical valve signal representing said rate of operation, and means for supplying said valve signal to said mixing means to modify said electrical input signal.

15. A system according to claim 14, wherein said sixth means includes a differentiating circuit whereby said electrical valve signal is a function both of said rate of operation of said control valve and also of the derivative of said rate of operation of said control valve.

16. A system according to claim 7, including a governor control circuit operable to limit the magnitude of said second control signal.

17. A system according to claim 7, wherein said third means comprises first electrical pick-off means responsive to the setting of said control member and arranged to generate a first electrical output signal representing said setting, second electrical pick-off means responsive to the actual setting of said control valve and arranged to generate a second electrical output signal representing said actual setting, and comparison means for comparing said first and second electrical output signals to derive said position error signal.

18. A system according to claim 7, wherein said rate-control means is responsive to compressor-turbine speed to limit the magnitude of said rate-control signal to a first amount at low compressor speeds and to a second amount greater than said first amount at high compressor speeds.

19. A system according to claim 18, wherein said rate-control means includes a pair of unidirectionally electrically conductive devices arranged to provide a shunt path for said rate-control signal and a bi-state device responsive to compressor-turbine speed to control the operation of said unidirectionally electrically conductive devices to vary said shunt path.

20. A system according to claim 7, wherein said first means includes sixth means responsive to compressor-turbine speed to derive a further electrical speed signal as a linear function of engine speed and includes seventh means responsive to compressor-turbine speed to derive an additional electrical speed signal as a predetermined non-linear function of engine speed and includes a mixer circuit responsive to said ambient temperature and supplied with said further and said additional electrical speed signals to derive therefrom an electrical datum signal representing the datum value of engine temperature as a function of the magnitude of the difference between said further and said additional signals modified as a function of ambient temperature and includes means responsive to engine temperature to derive an electrical temperature-measurement signal representing the engine temperature and includes circuit means supplied with said datum and temperature-measurement signals to derive said electric temperature signal in unidirectional form and representing the amount by which said datum value of said engine temperature exceeds said engine temperature.

References Cited by the Examiner

UNITED STATES PATENTS

| 2,727,356 | 12/55 | Brandau | 60—39.14 |
| 2,741,086 | 4/56 | Machlanski | 60—39.14 |
| 2,743,578 | 5/56 | Hazen | 60—39.28 |
| 2,851,855 | 9/58 | Gamble | 60—39.28 |
| 2,971,337 | 2/61 | Wintrode | 60—39.28 |
| 3,151,450 | 10/64 | Blackaby | 60—39.28 |

MARK NEWMAN, *Primary Examiner.*

SAMUEL LEVINE, *Examiner.*